US006827988B2

(12) United States Patent
Krause et al.

(10) Patent No.: US 6,827,988 B2
(45) Date of Patent: Dec. 7, 2004

(54) PROCESS AND A DEVICE FOR PRODUCING CERAMIC MOLDS

(75) Inventors: Tobias Krause, Clausthal-Zellerfeld (DE); Sven Engler, Clausthal-Zellerfeld (DE); Jens Gunster, Clausthal-Zellerfeld (DE); Jurgen G. Heinrich, Clausthal-Zellerfeld (DE)

(73) Assignee: Technische Universitat Clausthal, Clausthal-Zellerfeld (DE)

( * ) Notice: Subject to any disclaimer, the term of this patent is extended or adjusted under 35 U.S.C. 154(b) by 219 days.

(21) Appl. No.: 10/170,185

(22) Filed: Jun. 13, 2002

(65) Prior Publication Data

US 2003/0001313 A1 Jan. 2, 2003

(30) Foreign Application Priority Data

Jun. 15, 2001 (DE) .......................................... 101 28 664

(51) Int. Cl.[7] .............................................. C23C 14/30
(52) U.S. Cl. ...................................................... 427/596
(58) Field of Search ................................. 427/595, 596

(56) References Cited

U.S. PATENT DOCUMENTS 5,057,335 A * 10/1991 Hanagata et al. ............ 427/512
6,217,816 B1    4/2001 Tang

FOREIGN PATENT DOCUMENTS

| DE | 198 35 591 A 1 |    | 8/1998 |
| JP | 63-278835 | * | 11/1988 |
| JP | 11-338130 | * | 12/1999 |
| WO | WO 97/38810 | * | 10/1997 |

OTHER PUBLICATIONS

Kasai et al, J. Am. Ceram. Soc. 72(9), pp 1716–1718, 1989.*

* cited by examiner

*Primary Examiner*—Erma Cameron
(74) *Attorney, Agent, or Firm*—Whitham, Curtis & Christofferson, PC

(57) ABSTRACT

Ceramic molds are produced by sintering selected portions of a ceramic material with a laser beam to form the mold. The process involves application of at least one layer of a liquid suspension or plastic mass, drying the applied layer, and sintering the dried layer with the laser beam at selected areas to form the mold.

6 Claims, 1 Drawing Sheet

PROCESS AND A DEVICE FOR PRODUCING CERAMIC MOLDS

BACKGROUND OF THE INVENTION

1. Field of the Invention

The invention relates to a process and a device for producing ceramic molds by sintering selected areas of a ceramic material with a laser beam in order to form the mold.

2. Background of the Invention

In developing new products, industrial prototyping methods are employed after a prototype is digitally drafted with a CAD computer, in order to automatically produce a prototype, without further expensive production of the mold. As a result the cycle of development leading to product's introduction to the market can be shortened. In general these generative production processes work according to layer. Here the digital design draft of the prototype is realized in layers, e.g., ones which are built up in succession in the powder bed or by means of laminated layers. In the generative rapid prototyping method known to the prior art the replacement materials employed are usually plastics or metals. For an optimal generating process the use of these materials in the commercially conventional facilities is called for. The use of other materials, particularly ceramic masses, is usually not possible in view of the quality of the structural component, or is possible only to a limited degree. A problem with the layered production of a prototype with ceramic materials is posed by the material properties; here surface roughness and the danger of crack formation are particularly hard to master.

Rapid prototyping processes are described in sufficient detail in, e.g., Jensen, K.: State-of-the-Art of Different Available and Coming RP-Systems. Proceedings of $2^{nd}$ Scandinavian Rapid-Prototyping-Conference, Exhibition and Course" Aarhos, 1993 and Cheng X. Tucholke, U.: On Triangulating Surface Models for SLA, Proceedings of the $2^{nd}$ International Conference on Rapid Prototyping, Dayton, Ohio, Jun. 23–26, 1991. The essential features of these methods relate to the production of a mold's process control data from CAD geometry data, with subsequent control of the processing devices. Shaping is not performed through the removal of material, but through the addition of material or through the phase transition of a material from, e.g., liquid to solid, or through compaction of a starting material in powder form. All rapid prototyping methods directly employ CAD-geometry data to build up partial geometries of finite thickness, which are realized with the so-called slice process.

The available processes differ among themselves with respect to the initial state of the materials (solid, liquid, gaseous) that are used in the layering or constructive process.

One method is that of selective laser sintering, which was originally developed for powder made of nylon, for polycarbonate, and for waxes and was subsequently transferred to metallic powder. Here powder layers are sintered-fused onto a green body within a reactor; the melting temperature is reached with the aid of $CO_2$ lasers. This method is disclosed in, e.g., Lakshminarayan, U., Zong, G., Richards, W., Marcus, H.: Solid Free Form Fabrication of Ceramics. Proceedings of the Symposium on Synthesis and Processing of Ceramics, Fall Meeting of the Material Research Society, Boston, Mass., Dec. 2–6, 1991.

Another method is multiphase jet solidification (MJS), where the metallic powder-binder mixture is processed into layers with computer controlled nozzles, comparable to the injection molding process; the layers then comprise the structural component. This method is described in, e.g., N.N.: Rapid Prototyping turns to PM for new Solutions. Met. Powd. Rep. 3 (1955), 30–33.

A further method is stereolithography, where liquid, UV sensitive polymers are employed as the starting materials; these materials are hardened in layered fashion by laser irradiation and deposited on the substrate. The workpiece is built up in successive stages on a platform, which after hardening of the given layer is lowered in a resin bath by the appropriate layer height. This method is disclosed in, e.g., Pacheco, J. M.: Rapid Prototyping, MTIAC Report TA-91-01, January 1991. Haase, B.: Stereolithography at Chrysler Motors, Mircrocad [sic] News, [8] 1990 and in Machlis, S.: Cubital Claims Advantages Over Stereolithography, Design News, 30 (1990).

In the method called solid ground curing (SGC) liquid polymers are again employed as the starting material. After illumination with UV radiation, thin polymer layers harden on the given exposed site and thus form a structural component layer by layer. This method is described in, e.g., N.N.: Rapid Prototyping turns to PM for new Solutions. Met. Powd. Rep. 3 (1995), 30–33.

In this publication the method called simultaneous shot peening (SSP) is also disclosed, in which the surface of a suitable mold is reproduced by spraying with a liquid metal. This reproduction can serve, e.g., as part of an injection molding tool.

The publication also describes the method called fused deposition modelling (FDM), where, similar to the MJS process, a nozzle is moved in numerically controlled fashion (NC) over the workpiece under construction, whose height can be adjusted. The component is constructed by the trimming the molten material by layers and lowering the platform accordingly.

Another method is Laminated Object Manufacturing (LOM), which was originally developed for the manufacture of components out of paper or plastic. The component layers are cut with a laser from the individual positions and are laminated together using glues to form the workpiece. The use of aluminum oxide as a ceramic material in the LOM process is described in Griffin, C., Danfenbach, J. D., McMillin, S.: Desktop Manufacturing: LOM vs Pressing. Am. Ceram. Soc. Bull. 73 (1994), 109–113; here a laser is used to cut foils, which, for their part, were produced according to the so-called doctor-blade process.

The use of ceramic materials for the MJS process is also possible and is currently being researched at Rutgers University, New Jersey, USA.

DE-OS 198 35 591 A1 discloses a process for the production of sintered ceramic molds using laser beams. Here a ceramic granulate is applied in layers and is sintered with a laser beam. The granulate is produced by sifting, purifying, and fluidized-drying of a ceramic suspension; after the initial sifting the dried granulate is fired and then filtered again.

A problem with molds produced with granulated ceramic material is the limited accuracy of reproduction.

SUMMARY OF THE INVENTION

The goal of the invention, therefore, is to create an improved process and device for producing ceramic molds, where the mold is created by sintering selected portions of a ceramic material with a laser beam, with which process and device it is possible to achieve an improved accuracy of reproduction, an enhanced mechanical stability, and a reduction in the formation of cracks in the mold.

This goal is achieved by the invention in that a green body is created from a liquid suspension or from a plastic mass, followed by drying and selective sintering of the green body.

As compared to powdery or granulated ceramic material, the use of liquid suspensions or plastic masses allows the density of the green layers to be increased. As a result, layer thicknesses of less than 100 µm can be achieved. The increased green density results in a greater density after sintering and thus to an increased mechanical stability. Furthermore, the arising bed of green layers supports the sintered prototypes. Consequently it is unnecessary to consider support structures in the design.

From the example of porcelain it was recognized that the irradiation of powdery ceramic material with a laser results in a melt which only slightly moistens the granulate grains and which tends to form droplets due to the surface tension. More or less large drops with a diameter of about 1.5 mm consequently form and these join together to form the mold. The mechanical stability of the mold, therefore, is relatively low, so that it is necessary to infiltrate the component to provide sufficient strength.

To create the mold the liquid suspension or plastic mass is applied in layers and the given layer of the material is sintered with the laser beam at selective points. Here the laser beam will ideally be controlled by means of the layer-specific design data.

The layers will ideally be applied with a thickness of about 100 µm. This allows the quality of the mold to be increased.

The liquid suspension can be applied to particular advantage through a gap with a width in the range of 250 to 2000 µm, ideally 500 µm, in an oblong, hollow doctor blade. The suspension is be pressed through the hollow doctor blade, e.g., by compressed air from a storage container.

Before sintering, the ceramic material is dried by heating. It can be applied to a heated plate, whose temperature should initially be less than 100° C. at its surface to prevent evaporation of the water portion of the suspension. As the number of layers increases the temperature can then be increased above the boiling point of water. Additionally, or as an alternative, the layers can be heated with, e.g., a radiant heating system, in which case a ventilator should be provided to increase convection.

The laser process follows the heating. This is done by adjusting the energy input for sintering by coordinating the laser output, the laser focus, and the path speed of the laser focus on the green body.

Particularly suitable ceramic materials for the process are aluminum oxide ($Al_2O_3$) porcelain powder, highly pure silicic acid, aluminum nitride (AlN), silicon (Si) and silicon nitride ($Si_3N_4$).

The device for producing ceramic molds has a bearing area, an application unit for applying layers of ceramic material, a drying unit for drying the applied layers, and a laser unit for generating a laser beam, including means for guiding the laser beam to select points on a given layer of the ceramic material so as to sinter the exposed material and form the mold.

The application unit of the invention is designed for the application of a liquid suspension or a plastic mass to the bearing area.

The means for guiding the laser beam will ideally take the form of a laser scanner; the laser scanner will be controlled with digital design data for the mold. As a result, a prototype can be created directly from the design data.

The application unit will ideally take the form of an oblong, hollow doctor blade with a gap; the gap width will lie in range from 250 to 2000 µm, and will ideally be about 500 µm. An application unit of this kind is particularly suited for applying a liquid suspension. However, the application unit can also take the form of an extruder, among other things.

DESCRIPTION OF THE DRAWINGS

The invention will next be described in greater detail on the basis of the attached drawing. Shown is.

DETAILED DESCRIPTION OF THE INVENTION

Figure 1:
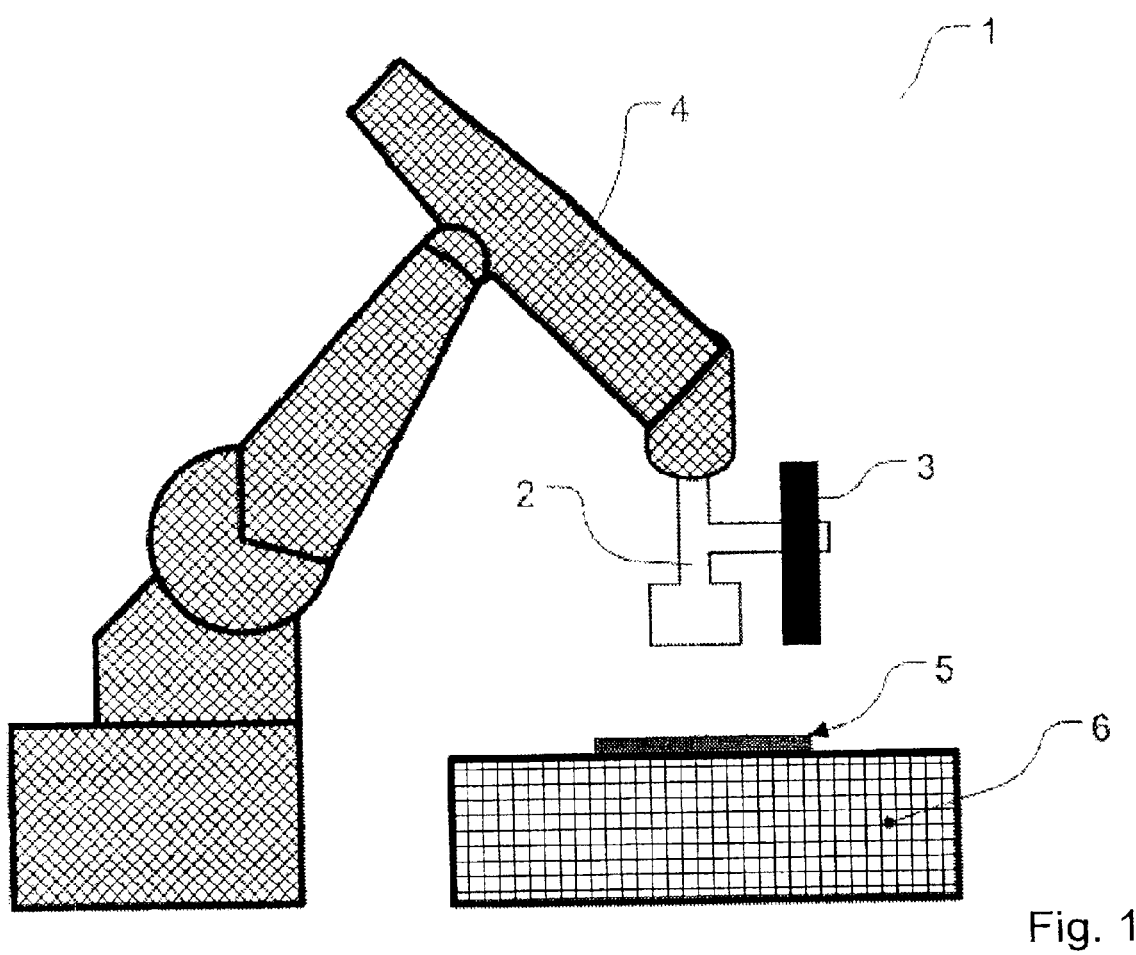
FIG. 1 a schematic view of a device for creating ceramic molds by sintering with a laser beam

FIG. 1 depicts a device (1) for producing ceramic molds by means of sintering a liquid suspension or plastic mass with a laser beam. The ceramic material in the form of a liquid suspension or a plastic mass is pressed through a hollow doctor blade (2) by compressed air from a storage container, which is not shown; the hollow doctor blade (2) has an opening gap with a gap width of about 500 µm. The doctor blade (2) is positioned on a robot arm (4), together with the laser unit (3) for producing a laser beam.

To create the mold the doctor blade (2) is first moved at a separating vertical distance of about 100 µm above a heated ceramic bearing area (5), and the ceramic material is applied in a thin layer. At its surface the heated bearing area (5) initially has a temperature of less than 100° C., so as to prevent the evaporation of the water content of the liquid suspension during the application of the first layer. After a drying time of up to 90 second the laser unit (3) is moved by the robot arm (4) over the surface of the applied layer and the given layer of the mold being formed is reproduced on the applied layer.

After completion of the laser process a new layer of a liquid suspension with a thickness of about 100 µm is applied, dried, and subjected to a renewed laser treatment.

The temperature for heating the ceramic material on the bearing area (5) can be sharply increased as the number of a layers increases and can rise above the boiling point of water, since the already applied layers are highly absorbent and will receive the moisture of the new layer within fractions of a second. The new layer of the liquid suspension is thereby stabilized, and the moisture is removed within less than 30 seconds.

In addition to drying from below, a source of radiant heat is also provided above the bearing area and is directed at the surface of the applied layers. To increase convection a ventilator should also be provided. The additional drying from above is advantageous because the mold bodies that arise due to sintering have an insulating effect, and consequently the temperature of the uppermost layers is usually too low for a sufficiently rapid drying process.

The green layers of the mold producible with the described process have a maximum porosity of 40% in the case of porcelain.

The robot arm (4) is controlled with the digital design data, which are drafted with a CAD system, are suitably sectioned in layers, and are exported as a data set for a numerically controlled processing machine (NC data set). The areas of the ceramic material not affected by the laser beam can be easily removed later, after being softened in a liquid solvent.

The invention provides that a specially adjusted liquid suspension or plastic mass is employed to produce the green layers. The advantage of using a liquid suspension in contrast to granules rests in the fact that the green density is comparable to ceramic bodies produced in conventional slip casting. The conventionally employed granules have an appreciably lower powder density. When the granules are irradiated by the laser the result is a melt which only slightly moistens the granules. For this reason the melt tends to form drops when the granules are loosely compacted, so that more or less large drops form, which join together into the mold. This results in a relatively low mechanical stability. By employing a liquid suspension or plastic mass, in contrast, layers of lesser thickness and a porosity below 40% (up to 100 μm) can be applied, which exhibit improved particle binding.

What we claim is:

1. A process for producing ceramic molds, comprising the steps of:

forming at least one layer of a liquid suspension or plastic mass which includes a ceramic material;

drying the at least one layer;

sintering by laser beam the at least one layer at selected areas; and repeating the forming, drying and sintering steps more than one time, with each successive layer being positioned on top of a preceding layer to form a mold.

2. A process according to claim 1, wherein the density of the mold has a porosity of less than 40%.

3. A process according to claim 2, wherein the layers have a thickness of 10 to 200 μm.

4. A process according to claim 1, wherein th energy input for sintering is set by coordinating a laser power, a laser focus, and a path speed of the laser focus on the at least one layer.

5. A process according to claim 1, wherein the ceramic material is selected from the group consisting of aluminum oxide ($Al_2O_3$), porcelain powder, highly pure silicic acid, aluminum nitride (AlN), silicon (Si), and silicon nitride ($Si_3N_4$).

6. A process according to claim 1, wherein the liquid suspension or plastic mass is applied through a gap in an oblong, hollow doctor blade, and the width of the gap lies in the range from 250 to 2000 μm.

* * * * *